(No Model.) 2 Sheets—Sheet 1.

C. D. BENNETT.
MACHINE FOR CUTTING PAVING BLOCKS.

No. 358,373. Patented Feb. 22, 1887.

Witnesses
T. W. Fowler
D. S. Clark

Inventor
Cyrus D. Bennett
By his Attorneys
A. H. Evans & Co.

(No Model.)  2 Sheets—Sheet 2.

C. D. BENNETT.
MACHINE FOR CUTTING PAVING BLOCKS.

No. 358,373. Patented Feb. 22, 1887.

Witnesses
T. W. Fowler
D. S. Clark

Inventor
Cyrus D. Bennett
By his Attorneys
A. H. Evans & Co.

UNITED STATES PATENT OFFICE.

CYRUS D. BENNETT, OF VASSAR, MICHIGAN, ASSIGNOR OF ONE-HALF TO FRANK NORTH, OF SAME PLACE.

MACHINE FOR CUTTING PAVING-BLOCKS.

SPECIFICATION forming part of Letters Patent No. 358,373, dated February 22, 1887.

Application filed September 14, 1886. Serial No. 213,490. (No model.)

*To all whom it may concern:*

Be it known that I, CYRUS D. BENNETT, of Vassar, in the county of Tuscola, State of Michigan, have invented a new and useful Improvement in Machines for Cutting Paving-Blocks, of which the following is a full, clear, and exact description, reference being had to the accompanying drawings, forming part of this specification, in which—

Figure 1:
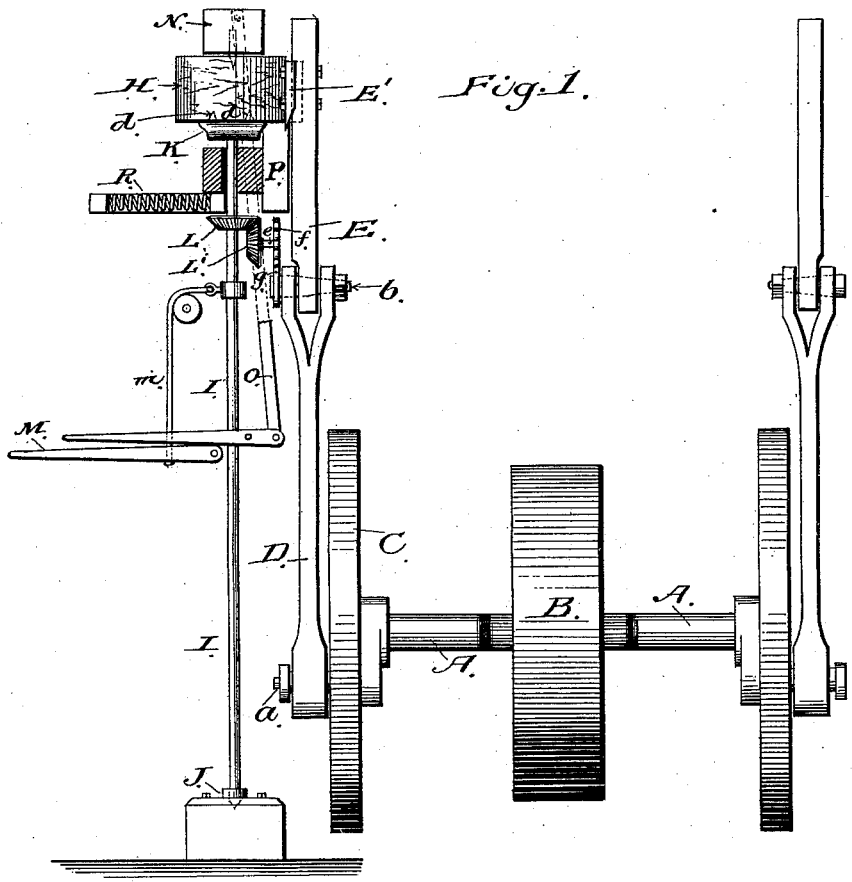
Figure 2:
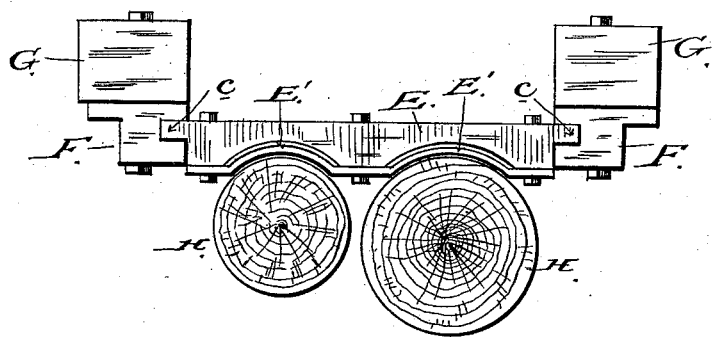
Figure 3:
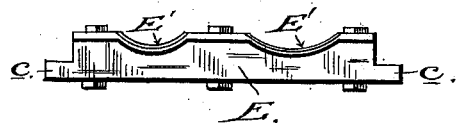

Figure 1 is an elevation of my improved machine, showing the block in position to be operated upon by the cutters. Fig. 2 is an end view showing the reciprocating head to which the cutters are secured, and showing the guides within which the head moves. Fig. 3 is a detail showing the head removed from its guides.

My invention relates to machines for cutting wooden blocks for paving purposes; and it consists in the peculiar construction and combination of devices, which I shall hereinafter fully describe and claim.

To enable others skilled in the art to make and use my invention, I will proceed to describe the manner in which I have carried it out.

In the said drawings, A represents the main operating-shaft, upon which a pulley, B, and disk or wheel C are mounted, the said pulley receiving power from any well-known source to operate the several mechanisms comprising the machine. A pitman, D, is connected at one end with the disks or wheels C by a wrist-pin, $a$, and has its opposite end bifurcated to receive one end of a cross-head, E, which is loosely journaled upon a pin or bolt, $b$, passing through the forked end of the pitman D and the end of said cross-head. The cross-head is provided with flanges $c$, which engage corresponding grooves formed in bars F, (see Figs. 2 and 3,) whereby said cross-head is accurately guided during its reciprocating movements, said bars F being securely bolted or otherwise fastened to suitable timbers, G, as shown in Fig. 2. The cross-head E has bolted to it suitable knives or cutters, E', whose configuration will depend on the shape of the blocks to be formed. In the drawings these cutters are shown as being curved, so as to give the necessary shape to the round blocks H. (Shown in Figs. 1 and 2.)

The block to be shaped is supported upon the end of a shaft, I, whose lower end rests in a suitable step, J, while upon its opposite end is a disk, K, having projections or spurs $d$, which enter the body of the block and assist in turning said block during the rotary movements of the shaft I, upon which said block is supported, or the shaft may be rotated by a hand or foot lever.

The shaft I does not have a continuous rotary movement, but rather an intermittent one, which occurs during the upward movement of the cross-head. The means for producing this movement are very simple and comprise two intermeshing miter-gears, L L', the former being mounted on the shaft I, and the latter upon one end of a stud, $e$, which is suitably supported, and carries at its opposite end a ratchet-wheel, $f$, which is engaged by a pawl, $g$, upon the bolt $b$, before described.

From this description it will be seen the rotary movement of the main shaft and disk or wheel C causes the pitman D and cross-head E to be reciprocated. When these latter elements are making their upward movement they cause the pawl $g$ to engage the teeth of the ratchet-wheel $f$, thereby rotating said wheel and its adjacent miter-gear, L'. The miter-gear L', meshing with the similar gear, L, imparts to the latter a rotary movement, which, through the medium of shaft I and disk K, rotates the wooden block sufficiently to bring a new surface to the action of the cutters just prior to their succeeding downward stroke. The gears L L' may be thrown into or out of engagement with each other by means of a foot-lever, M, having an arm or connection, $m$, connected with a collar on the shaft, whereby said shaft may be raised and disconnected with the other operating portions of the machine, when the circumstances require.

In order to securely hold the wooden block, I employ a presser-bar, N, having a center spur or projection engaging the said block, and having its ends connected with a suitably-fulcrumed foot-lever by means of connecting-rods O, whereby said presser-bar may be lifted from its engagement with the block by simply pressing upon the foot-lever before referred to.

Near the upper end of the shaft is placed a block or timber, P, which is designed to receive the thrust of the cutters while on the downward stroke.

To facilitate the successful operation of the cutters, I employ a spring, R, or its equivalent, which engages the shaft I near its upper end, and keeps said shaft and the wooden block up against the knives or cutters.

I have shown and described the several mechanisms as being upon one end of the main operating-shaft; but it is evident the said elements may be duplicated and attached to both ends of said shaft without departing from the spirit of my invention.

Having thus described my invention, what I claim as new, and desire to secure by Letters Patent, is—

1. The combination, with the cross-head and its operative mechanism, of a shaft mounted in proximity to the cross-head having a disk, with spurs projecting therefrom and engaging the paving-block, a mechanism between said shaft and cross-head for intermittently rotating the former, a presser-bar on top of the block, a spring for holding the block against the cutters, and a lever and connecting-rods for raising the presser-bar from its contact with said block, substantially as herein described.

2. The combination, with the cross-head and its operative mechanism, of a shaft mounted in proximity to said cross-head and supporting the paving-block, a mechanism between said shaft and cross-head for intermittently rotating the former, a lever connected with the shaft to throw the same into or out of gear with said mechanism, and a spring or equivalent device for holding the shaft and block against the cutters, substantially as herein described.

CYRUS D. BENNETT.

Witnesses:
E. H. TAYLOR,
C. C. YERKES.